US011249626B2

(12) United States Patent
Soni et al.

(10) Patent No.: US 11,249,626 B2
(45) Date of Patent: Feb. 15, 2022

(54) INTERACTIVE INTERFACE FOR IDENTIFYING DEFECTS IN VIDEO CONTENT

(71) Applicant: Netflix, Inc., Los Gatos, CA (US)

(72) Inventors: Abhishek Soni, Milpitas, CA (US); Adithya Prakash, Campbell, CA (US); Shraddha Ladda, Mountain View, CA (US); Thomas E. Mack, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 16/262,904

(22) Filed: Jan. 30, 2019

(65) Prior Publication Data
US 2020/0241734 A1  Jul. 30, 2020

(51) Int. Cl.
  *G06F 3/0484* (2013.01)
  *G06F 3/0482* (2013.01)
  *G06T 7/20* (2017.01)
  *G11B 27/031* (2006.01)
  *G06T 5/00* (2006.01)

(52) U.S. Cl.
  CPC ........ *G06F 3/04845* (2013.01); *G06F 3/0482* (2013.01); *G06T 5/005* (2013.01); *G06T 7/20* (2013.01); *G11B 27/031* (2013.01); *G06F 2203/04803* (2013.01); *G06T 2200/24* (2013.01); *G06T 2207/10016* (2013.01)

(58) Field of Classification Search
  CPC ..... G06K 9/00711–00765; G06F 3/048; G06F 2203/04803; G06F 16/07; G06F 3/0482; G06F 3/04845; G06T 2207/10016–10021; G06T 11/203; G06T 7/20–292; G06T 7/0002–0016; G06T 7/0004–001; G06T 5/005; G06T 2200/24; G11B 27/031–038
  See application file for complete search history.

(56) References Cited

U.S. PATENT DOCUMENTS 9,202,299 B2 * 12/2015 Edwin ............... G06T 11/60
10,025,988 B2 * 7/2018 Yuan ................. G06K 9/4652

(Continued)

OTHER PUBLICATIONS

MTI Film. "Dead Pixels in Cortex V4". Youtube. Dec. 7, 2017. https://www.youtube.com/watch?v=nxFBQFOcws4&list=PLNNv1rGYCLC0h86zX9kSRLREicl62S_oy&index=10 (Year: 2017).*

(Continued)

*Primary Examiner* — Liang Y Li
(74) *Attorney, Agent, or Firm* — FisherBroyles, LLP

(57) ABSTRACT

The disclosed computer-implemented method may include accessing defect identification data that identifies defects in frames of video content. The method may also include generating, as part of the interactive user interface, an interactive element that presents the frames of video content. The method may further include generating, as part of the interactive user interface, another interactive element that presents selectable metadata items associated with the identified defects in the frames of video content. At least one of the selectable metadata items may include an associated user interface action. Then, upon receiving an input selecting one of the selectable metadata items, the method may include performing the associated user interface action. Various other methods, systems, and computer-readable media are also disclosed.

20 Claims, 9 Drawing Sheets

(56) References Cited

U.S. PATENT DOCUMENTS

| | | | |
|---|---|---|---|
| 2009/0028232 A1 | 1/2009 | Baumgartner et al. | |
| 2010/0223649 A1* | 9/2010 | Suitts | H04N 21/8549 725/105 |
| 2014/0026053 A1 | 1/2014 | Huang et al. | |
| 2014/0082558 A1* | 3/2014 | Lynch | G06F 3/0481 715/835 |
| 2014/0185678 A1 | 7/2014 | Liao et al. | |
| 2015/0179219 A1* | 6/2015 | Gao | G06K 9/00664 386/278 |
| 2015/0319506 A1 | 11/2015 | Kansara et al. | |
| 2017/0109122 A1 | 4/2017 | Schmidt et al. | |
| 2018/0322623 A1* | 11/2018 | Memo | G06N 3/084 |
| 2019/0370950 A1* | 12/2019 | Fang | G06T 7/001 |

OTHER PUBLICATIONS

SimpleMoGraph. After Effects Tutorial—How to scale a composition to a new size. Dec. 29, 2014. Youtube, https://www.youtube.com/watch?v=KLOR97dTicY (Year: 2014).*

Wang, Xiaosong, and Majid Mirmehdi. "HMM based Archive Film Defect Detection with Spatial and Temporal Constraints." BMVC. 2009. (Year: 2009).*

International Search Report and Written Opinion received for PCT Application Serial No. PCT/US2019/067292 dated Apr. 14, 2020, 12 pages.

\* cited by examiner

INTERACTIVE INTERFACE FOR IDENTIFYING DEFECTS IN VIDEO CONTENT

BACKGROUND

Video content is being produced at an ever-increasing rate. Whether the video content is produced by amateurs or professionals, more and more websites, video provisioning services, and other video sources are streaming content to user's devices over the internet. These devices may include an array of different platforms including televisions, computer monitors, smartphones, tablets, wearable devices, augmented reality or virtual reality devices, or other electronic devices. Each may be configured to receive and display video content at different resolutions, at different frame rates, in different encodings, or using different settings. Moreover, each device may use different software applications to decode and display the video content.

Such a variety of platforms may make it difficult to test whether the video content will be displayed appropriately on each electronic device. For instance, some video content may include problems or defects that the producers will want to remove. Some of these defects may only be noticeable at very high resolutions (e.g., ultra-high definition (UHD) or 4k), while other defects may only appear at low resolutions. Still further, the techniques used to identify and remove defects may be different based on the type of content, based on the type of encoding, or based on other factors. Accordingly, it may be difficult for professionals or even amateurs to fully test their video content to ensure that the content is free of defects, regardless of which platform is used to view the content.

SUMMARY

As will be described in greater detail below, the instant disclosure describes methods and systems for generating an interactive user interface which may be used to identify defects in video content.

In one example, a computer-implemented method for generating an interactive user interface (UI) may include accessing defect identification data that identifies defects in video content. The method may then include generating, as part of the interactive user interface, an interactive element configured to present at least one frame of video content. The method may further include generating, as part of the interactive user interface, another interactive element configured to present selectable metadata items associated with the identified defects in the frame of video content. The selectable metadata items may include associated user interface actions. The method may also include performing the associated user interface action upon receiving an input selecting at least one of the metadata items.

In some examples, a user interface action may allow a user to interact with the defects identified in the video content. In some examples, the user interface action may include automatically drawing a border around at least one of the identified defects within a presented frame of video content. In some examples, the defect identified in the video content may be a dead pixel. In such cases, defect identification data may include location information identifying the location of the dead pixel. The defect identification data may also include frame-level metadata information. In some examples, the defect in the video content may be identified at one resolution, and the frame of video content may be presented in the UI interactive element in a different resolution. In some examples, the method may further include extrapolating location data for the identified defect at the different resolution, so that the defect may be outlined in the extrapolated location in the different resolution. The user interface action may allow a user, upon selecting at least one of the selectable metadata items, to provide feedback regarding a defect associated with that metadata item.

In some examples, the method may further include receiving feedback regarding a given defect, and then implementing the received feedback in subsequent video content assessments to identify defects in the video content. In some examples, the method may further include grouping two or more defects together into a defects group, where the defects group includes defects identified within a specified distance of each other. In some examples, the method may further include generating a confidence score for the defects group. The confidence score may indicate a frequency of the defects occurring within the defined group over a specified amount of time or over a specified number of frames. In some examples, the user interface action may include allowing a user to draw a bounded shape within an interactive UI element. The bounded shape may define a defect group, such that those defects that are within the bounded shape are part of the defect group.

In addition, a corresponding system for generating an interactive user interface may include several modules stored in memory, including an accessing module configured to access defect identification data that identifies defects in at least one frame of video content. The system may also include a generating module configured to generate, as part of an interactive user interface, a first interactive element configured to present a frame of video content, as well as generate a second interactive element configured to present selectable metadata items associated with the identified defects in the frame of video content. The selectable metadata s may include various associated user interface actions. The system may also include a user interface action module which, upon receiving an input selecting at least one of the selectable metadata items, may perform the associated user interface action. The system may also include a processor configured to execute the above-recited modules.

In some examples, the system may further include an assigning module configured to assign a confidence score to at least one of the identified defects. The confidence score may be generated based on a frequency of the identified defect occurring within a specified timeframe or within a specified number of frames. The second interactive element of the interactive user interface may then present the identified defects based on the assigned confidence score. In some examples, defects may be presented within the second interactive element of the interactive user interface in a list of defects. Those defects with a higher confidence score may be presented higher in the list of defects.

In some examples, the system may further include an object detection module configured to implement an object detection algorithm to detect objects within a specified segment of the video content. The system may also include an object tracking module configured to track at least one of the detected objects to determine whether the tracked object is a defect.

In some examples, the system may further include a screencasting user interface element that, when selected, casts at least a portion of the video content onto a specified display. The system may also include user interface tools presented within the interactive user interface that allow a user to interact with the video content cast onto the specified display.

In some examples, the user interface tools may include a user interface element that allows a user to switch between different video resolutions when casting the video content. In some examples, the interactive element of the interactive user interface may include a navigation user interface that allows a user to navigate between video frames presented in another interactive UI element. The navigation user interface may also allow users to navigate between defects identified in the video content.

In some examples, the above-described method may be encoded as computer-readable instructions on a computer-readable medium. For example, a computer-readable medium may include one or more computer-executable instructions that when executed by at least one processor of a computing device, may cause the computing device to generate an interactive user interface. The computing device may access defect-identification data that identifies defects in at least one frame of video content and may generate, as part of an interactive user interface, an interactive element configured to present the at least one frame of video content. The computing device may also generate, as part of the interactive user interface, another interactive element configured to present selectable metadata items associated with the identified defects in the frame of video content. At least one of the selectable metadata items may include an associated user interface action. The computing device may also perform the associated user interface action upon receiving an input selecting one of the selectable metadata items.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
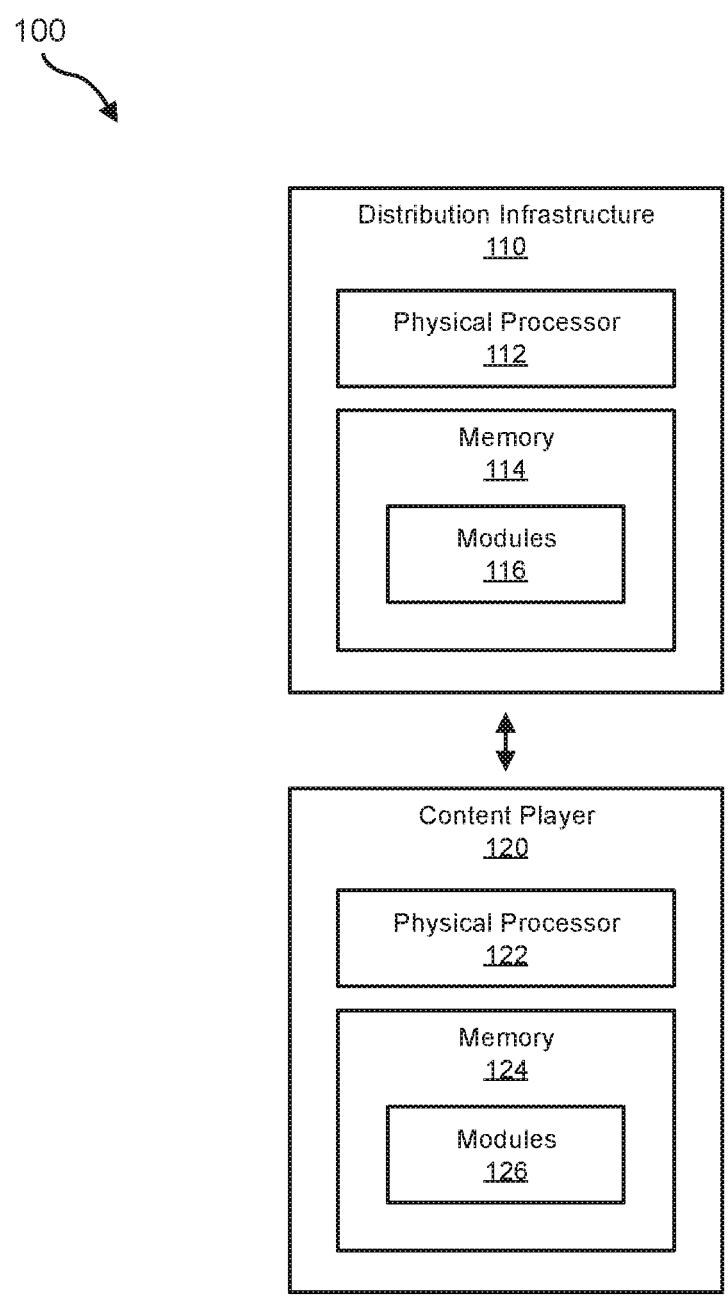
FIG. 1 is a block diagram of an exemplary content distribution ecosystem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Video content producers are often very meticulous about the content they distribute to the public. These content producers may spend a great deal of time and effort ensuring that their movie or video clip looks and sounds professional. To this end, many content producers (both professional and amateur) may spend many hours combing their videos for defects. These defects may include a wide range of issues including, for example, objects shown in a frame that are not supposed be there, portions of a video frame that are pixelated or include digital artifacts, dead pixels or other types of errors. Dead pixels may occur as the result of hardware malfunctions. A camera's light detecting mechanism, for example, may have light detecting pixels that are not working properly. As such, that camera will not properly detect color at those pixels. These dead pixels may be visible in the content producer's end product, manifested in pixels that are permanently stuck white or stuck dark. This can be distracting to users and can cause the movie or video to appear unprofessional.

To find defects in a piece of video content, producers would often employ a user to thoroughly scan each frame of the video. Users would sit down with a screen and a movie and meticulously watch each part of the video for the presence of defects. If the user found any of these defects, the user would make a note of the location and move on to the next part of the movie. In other cases, producers have implemented software algorithms to identify defects such as dead pixels. In such cases, a software algorithm designed to look for dead pixels would analyze each pixel in a frame and determine if and how that pixel's color value changed over time. If the pixel's color value did not change throughout the course of the movie, then that pixel would be deemed to be dead. Once the software algorithm identified the dead pixels (or other defects), the user would still need to navigate to the spot in the movie where the defect was said to exist and verify whether the defect is actually present at that location. In such systems, the user had no way to navigate between defects or to identify or log additional information related to defects.

Accordingly, an interactive user interface is presented and described here that allows users such as quality control technicians to easily navigate to defects, verify the defects and resolve the defects. The interactive user interface also allows users to easily jump through a list of defects or select individual defects to find out more information about them. Still further, users implement the interactive user interface to highlight defects or potential defects in certain locations on a frame. Once the user has highlighted these potential defects, a software algorithm may use that information as feedback when running subsequent checks for defects. Users can also implement the interactive user interface to group defects together into user-defined groups. This allows the user to determine whether a group of defects is present throughout a movie or repeatedly appears during scenes shot by a certain camera. If so, the user may indicate to the producer that a certain camera appears to be faulty. The producer may then be able to replace the faulty equipment before shooting any further scenes with it.

Users can also implement the interactive user interface to perform quality control testing on different screens that may have different resolutions. In some cases defects may only manifest themselves at certain resolutions or may manifest themselves at different locations in a frame at different resolutions. For instance, a defect may be located in a certain position in a frame at 4K resolution (e.g., 3,840×2,160 pixels) and may be located at a slightly different location in HD resolution (e.g., 1,920×1,080 pixels). The interactive user interface may allow the user to find such defects and account for the new location of the defect at the different resolutions. The interactive user interface may further be configured to present any identified defects in a curated form. For example, the interactive user interface may list the defects by occurrence from the highest number of occurrences to the least or may be arranged in a user-selected manner.

The interactive user interface may also allow a user to perform quality control testing using nearly any kind of screen, including a smartphone, tablet, laptop or other portable device. Using the interactive user interface, the user can screencast their portable device's screen to another display device such as a television or a computer monitor. The television or computer monitor may be capable of a much higher resolution. As such, in one example, the user may use their phone to perform quality control testing, screencasting their phone screen onto a high-definition television or monitor. The high-definition display may show the interactive user interface, a current frame of the video content, and a list of defects, each of which is individually selectable. By selecting a defect, the user may be taken to the next part of the video content that has that defect. The high-definition display may then show the frame of video content having the defect and may provide tools which the user can implement to highlight defects and perform other actions. Accordingly, in this manner, the interactive user interface may provide a wide range of functionality not previously unavailable in legacy systems.

The present disclosure is generally directed to generating an interactive user interface that may be used to identify defects in video content. As will be explained in greater detail below, embodiments of the instant disclosure may provide an interactive user interface that allows users to view and navigate between different frames of a video or between different defects found in the video. The interactive user interface may also provide selectable metadata items that allow a user to view information about certain defects.

For example, in some cases, video content may be subjected to quality control algorithms that check for defects. These quality control algorithms may analyze the video content for different types of defects including, for example, dead pixels (e.g., pixels that are stuck high or are stuck low), objects that should not be present in the video (e.g., boom microphones, cameras, human shadows), or other artifacts or elements that should not be part of a finished video product. These quality control procedures may thus identify defects in the video content and may further produce data related to the identified defects. As will be detailed below, this data may be accessed and used by the systems described to provide a user (e.g., a quality control technician) with a much greater amount of control over how defects are identified, verified and resolved.

The interactive user interface embodiments described herein may also provide many other features, including enabling a user to more easily mark or highlight defects within a given frame or within a series of frames, enabling a user to more easily group defects together and identify trends or patterns within the defects, enabling a user to generate a confidence score related to a specific defect or group of defects, enabling a user to cast video content to a secondary screen while still performing quality control tasks using the interface and perform other related tasks. These and other embodiments will be described further below with regard to FIGS. 1-11.

Figure 2:
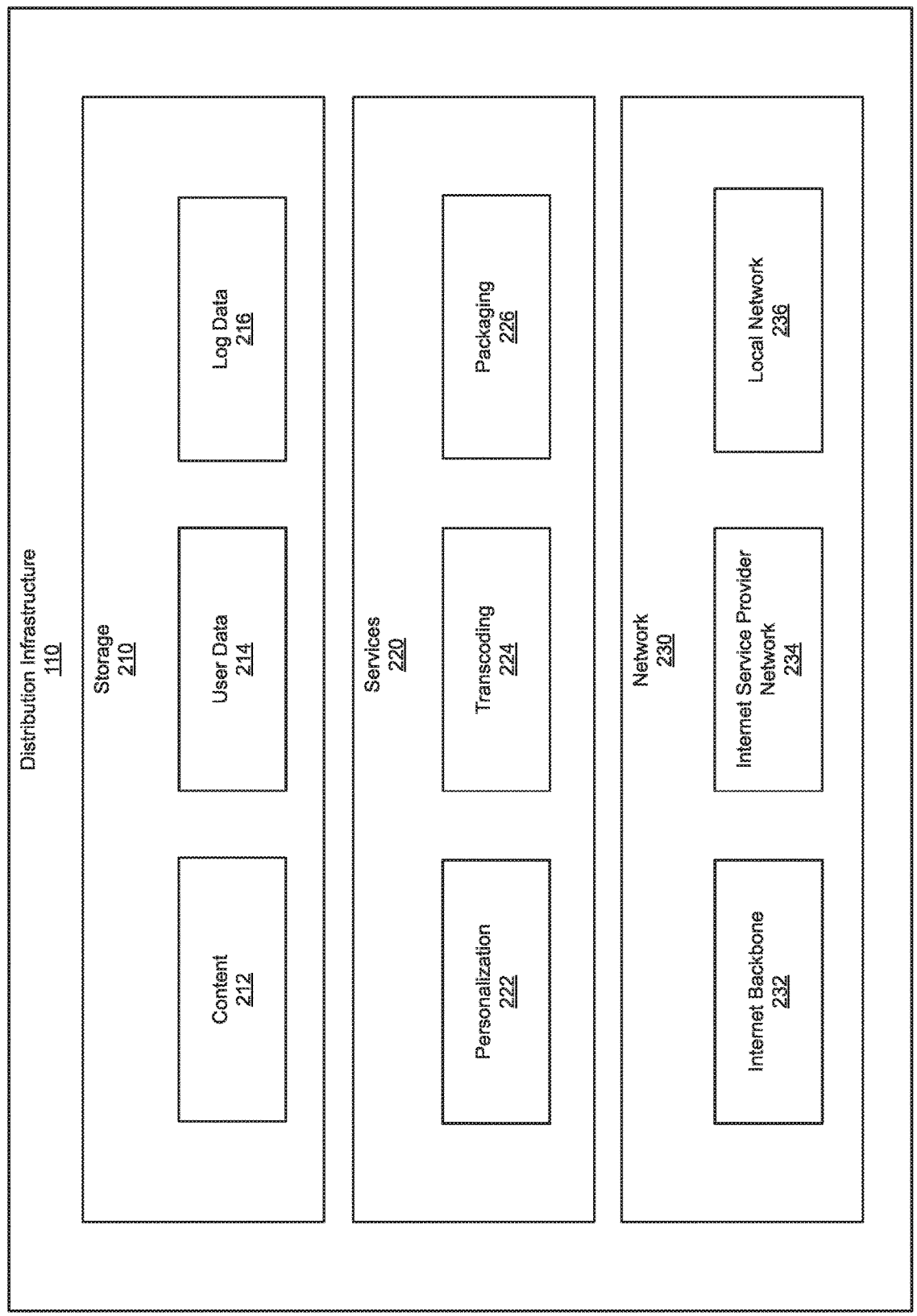
FIG. 2 is a block diagram of an exemplary distribution infrastructure within the content distribution ecosystem shown in FIG. 1.
Figure 3:
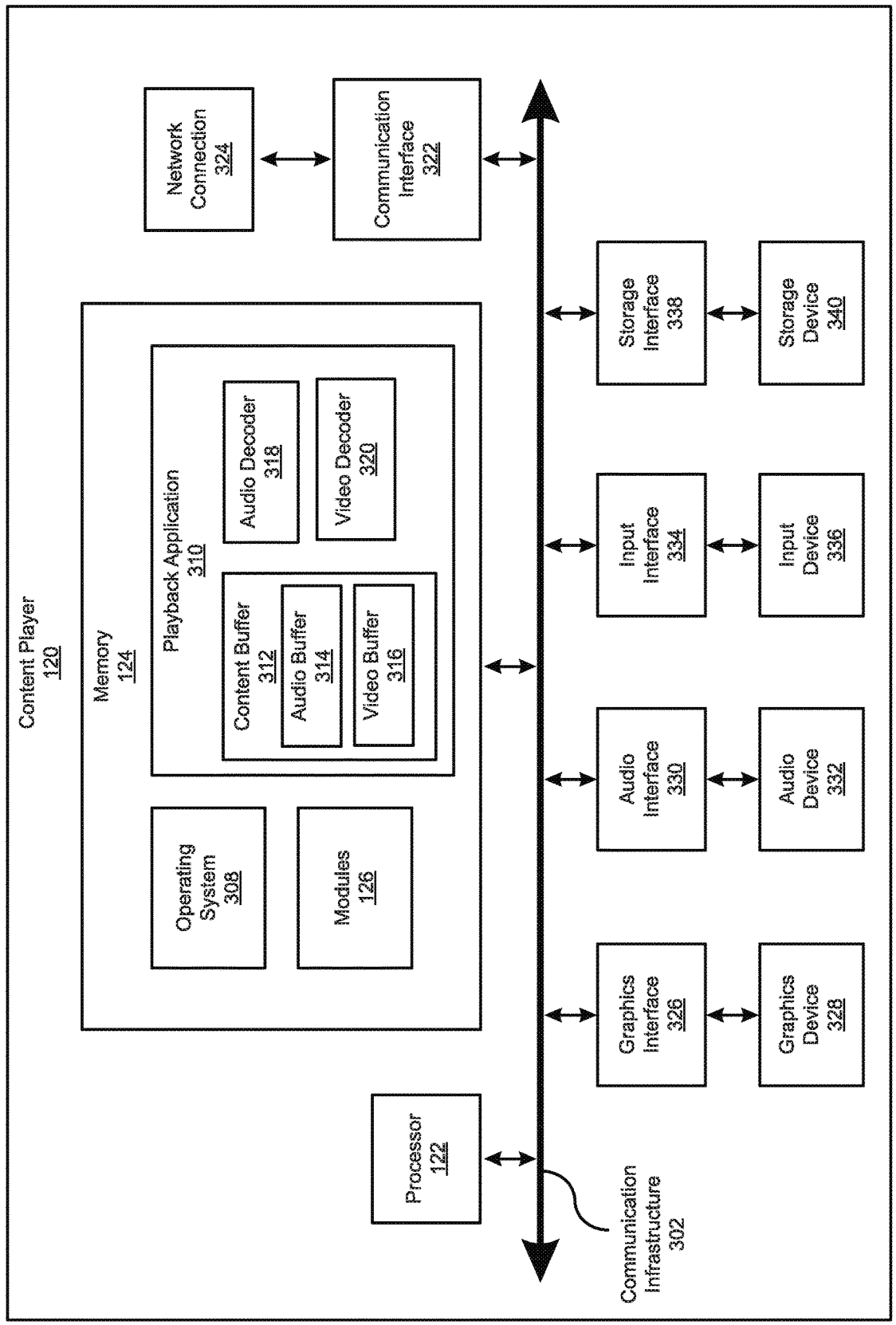
FIG. 3 is a block diagram of an exemplary content player within the content distribution ecosystem shown in FIG. 1.

Because many of the embodiments described herein may be used with substantially any type of video content or any type of video streaming content provider, FIGS. 1-3 will introduce the various ways in which video content may be provisioned to users and ultimately consumed by users. FIGS. 4-11 will describe more specific embodiments in which an interactive interface for identifying and verifying defects in such video content may be generated and provided to a user.

FIG. 1 is a block diagram of a content distribution ecosystem 100 that includes a distribution infrastructure 110 in communication with a content player 120. In some embodiments, distribution infrastructure 110 may be configured to encode data and to transfer the encoded data to content player 120. Content player 120 may be configured to receive the encoded data via distribution infrastructure 110 and to decode the data for playback to a user. The data provided by distribution infrastructure 110 may include audio, video, text, images, animations, interactive content, haptic data, virtual or augmented reality data, location data, gaming data, or any other type of data that may be provided via streaming.

Distribution infrastructure 110 generally represents any services, hardware, software, or other infrastructure components configured to deliver content to end users. For example, distribution infrastructure 110 may include content aggregation systems, media transcoding and packaging services, network components, and/or a variety of other types of hardware and software. Distribution infrastructure 110 may be implemented as a highly complex distribution system a single media server or device, or anything in between. In some examples, regardless of size or complexity, distribution infrastructure 110 may include at least one physical processor 112 and at least one memory device 114. One or more modules 116 may be stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 may include a physical processor 122, memory 124, and one or more modules 126. Some or all of the adaptive streaming processes described herein may be performed or enabled by modules 126, and in some examples, modules 116 of distribution infrastructure 110 may coordinate with modules 126 of content player 120 to provide adaptive streaming of multimedia content.

In certain embodiments, one or more of modules 116 and/or 126 in FIG. 1 may represent one or more software applications or programs that, when executed by a computing device may cause the computing device to perform one or more tasks. For example, and as will be described in greater detail below, one or more of modules 116 and 126 may represent modules stored and configured to run on one or more general-purpose computing devices. One or more of modules 116 and 126 in FIG. 1 may also represent all or portions of one or more special-purpose computers configured to perform one or more tasks.

In addition, one or more of the modules, processes, algorithms, or steps described herein may transform data, physical devices, and/or representations of physical devices from one form to another. For example, one or more of the modules recited herein may receive defect identification data, transform the defect identification data by preparing the defect identification data for presentation in an interactive user interface, provide the result of the transformation to the interactive user interface, and render the transformed defect identification data on the interactive user interface. Additionally or alternatively, one or more of the modules recited herein may transform a processor volatile memory non-volatile memory, and/or any other portion of a physical computing device from one form to another by executing on the computing device, storing data on the computing device, and/or otherwise interacting with the computing device.

Physical processors 112 and 122 generally represent any type or form of hardware-implemented processing unit capable of interpreting and/or executing computer-readable instructions. In one example, physical processors 112 and 122 may access and/or modify one or more of modules 116 and 126, respectively. Additionally or alternatively, physical processors 112 and 122 may execute one or more of modules 116 and 126 to facilitate adaptive streaming of multimedia content. Examples of physical processors 112 and 122 include, without limitation microprocessors, microcontrollers central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 may store, load, and/or maintain one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 2 is a block diagram of exemplary components of content distribution infrastructure 110 according to certain embodiments. Distribution infrastructure 110 may include storage 210, services 220, and a network 230. Storage 210 generally represents any device, set of devices, and/or systems capable of storing content for delivery to end users. Storage 210 may include a central repository with devices capable of storing terabytes or petabytes of data and/or may include distributed storage systems (e.g., appliances that mirror or cache content at Internet interconnect locations to provide faster access to the mirrored content within certain regions). Storage 210 may also be configured in any other suitable manner.

As shown, storage 210 may store, among other items content 212, user data 214, and/or log data 216. Content 212 may include television shows, movies, video games, user-generated content, and/or any other suitable type or form of content. User data 214 may include personally identifiable information (PII), payment information, preference settings, language and accessibility settings, and/or any other information associated with a particular user or content player. Log data 216 may include viewing history information, network throughput information, and/or any other metrics associated with a user's connection to or interactions with distribution infrastructure 110.

Services 220 may include personalization services 222, transcoding services 224, and/or packaging services 226. Personalization services 222 may personalize recommendations, content streams, and/or other aspects of a user's experience with distribution infrastructure 110. Encoding services 224 may compress media at different bitrates which may enable real-time switching between different encodings. Packaging services 226 may package encoded video before deploying it to a delivery network, such as network 230, for streaming.

Network 230 generally represents any medium or architecture capable of facilitating communication or data transfer. Network 230 may facilitate communication or data transfer using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 may include an Internet backbone 232, an internet service provider 234, and/or a local network 236.

FIG. 3 is a block diagram of an exemplary implementation of content player 120 of FIG. 1. Content player 120 generally represents any type or form of computing device capable of reading computer-executable instructions. Content player 120 may include, without limitation, laptops, tablets, desktops, servers, cellular phones, multimedia players, embedded systems, wearable devices smart watches, smart glasses, etc.), smart vehicles, gaming consoles, internet-of-things (IoT) devices such as smart appliances, variations or combinations of one or more of the same and/or any other suitable computing device.

As shown in FIG. 3, in addition to processor 122 and memory 124, content player 120 may include a communication infrastructure 302 and a communication interface 322 coupled to a network connection 324. Content player 120 may also include a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 may store and/or load an operating system 308 for execution by processor 122. In one example, operating system 308 may include and/or represent software that manages computer hardware and software resources and/or provides common services to computer programs and/or applications on content player 120.

Operating system 308 may perform various system management functions, such as managing hardware components (e.g., graphics interface 326, audio interface 330, input interface 334, and/or storage interface 338). Operating system 308 may also process memory management models for playback application 310. The modules of playback application 310 may include, for example, a content buffer 312, an audio decoder 318, and a video decoder 320.

Playback application 310 may be configured to retrieve digital content via communication interface 322 and play the digital content through graphics interface 326. Graphics interface 326 may be configured to transmit a rendered video signal to graphics device 328. In normal operation, playback application 310 may receive a request from a user to play a specific title or specific content. Playback application 310 may then identify one or more encoded video and audio streams associated with the requested title. After playback application 310 has located the encoded streams associated with the requested title, playback application 310 may download sequence header indices associated with each encoded stream associated with the requested title from distribution infrastructure 110. A sequence header index associated with encoded content may include information related to the encoded sequence of data included in the encoded content.

In one embodiment, playback application 310 may begin downloading the content associated with the requested title by downloading sequence data encoded to the lowest audio and/or video playback bit rates to minimize startup time for playback. The requested digital content file may then be downloaded into content buffer 312, which may be configured to serve as a first-in, first-out queue. In one embodiment, each unit of downloaded data may include a unit of video data or a unit of audio data. As units of video data associated with the requested digital content file are downloaded to the content player 120, the units of video data may be pushed into the content buffer 312. Similarly, as units of audio data associated with the requested digital content file are downloaded to the content player 120, the units of audio data may be pushed into the content buffer 312. In one embodiment, the units of video data may be stored in video buffer 316 within content buffer 312 and the units of audio data may be stored in audio buffer 314 of content buffer 312.

A video decoder 320 may read units of video data from video buffer 316 and may output the units of video data in a sequence of video frames corresponding in duration to the fixed span of playback time. Reading a unit of video data from video buffer 316 may effectively de-queue the unit of video data from video buffer 316. The sequence of video frames may then be rendered by graphics interface 326 and transmitted to graphics device 328 to be displayed to a user.

An audio decoder 318 may read units of audio data from audio buffer 314 and output the units of audio data as a sequence of audio samples, generally synchronized in time with a sequence of decoded video frames. In one embodiment, the sequence of audio samples may be transmitted to audio interface 330, which may convert the sequence of audio samples into an electrical audio signal. The electrical audio signal may then be transmitted to a speaker of audio device 332, which may, in response, generate an acoustic output.

In situations where the bandwidth of distribution infrastructure 110 is limited and/or variable, playback application 310 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Graphics interface 326 may be configured to generate frames of video data and transmit the frames of video data to graphics device 328. In one embodiment, graphics interface 326 may be included as part of an integrated circuit, along with processor 122. Alternatively graphics interface 326 may be configured as a hardware accelerator that is distinct from (i.e., is not integrated within) a chipset that includes processor 122.

Graphics interface 326 generally represents any type or form of device configured to forward images for display on graphics device 328. For example, graphics device 328 may be fabricated using liquid crystal display (LCD) technology, cathode-ray technology, and light-emitting diode (LED) display technology (either organic or inorganic). In some embodiments, graphics device 328 may also include a virtual reality display and/or an augmented reality display. Graphics device 328 may include any technically feasible means for generating an image for display. In other words, graphics device 328 generally represents any type or form of device capable of visually displaying information forwarded by graphics interface 326.

As illustrated in FIG. 3, content player 120 may also include at least one input device 336 coupled to communication infrastructure 302 via input interface 334. Input device 336 generally represents any type or form of computing device capable of providing input, either computer or human generated, to content player 120. Examples of input device 336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 120 may also include a storage device 340 coupled to communication infrastructure 302 via a storage interface 338. Storage device 340 generally represent any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems may be included in or connected to content player 120. Conversely, one or more of the components and devices illustrated in FIG. 3 need not be present to practice the embodiments described and/or illustrated herein. The devices and subsystems referenced above may also be interconnected in different ways from that shown in FIG. 3. Content player 120 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program may be loaded into content player 120. All or a portion of the computer program stored on the computer-readable medium may then be stored in memory 124 and/or storage device 340. When executed by processor 122, a computer program loaded into memory 124 may cause processor 122 to perform and/or be a means for performing the functions of one or more of the example embodiments described and/or illustrated herein. Additionally or alternatively, one or more of the example embodiments described and/or illustrated herein may be implemented in firmware and/or hardware. For example, content player 120 may be configured as an Application Specific Integrated Circuit (ASIC) adapted to implement one or more of the example embodiments disclosed herein.

Figure 4:
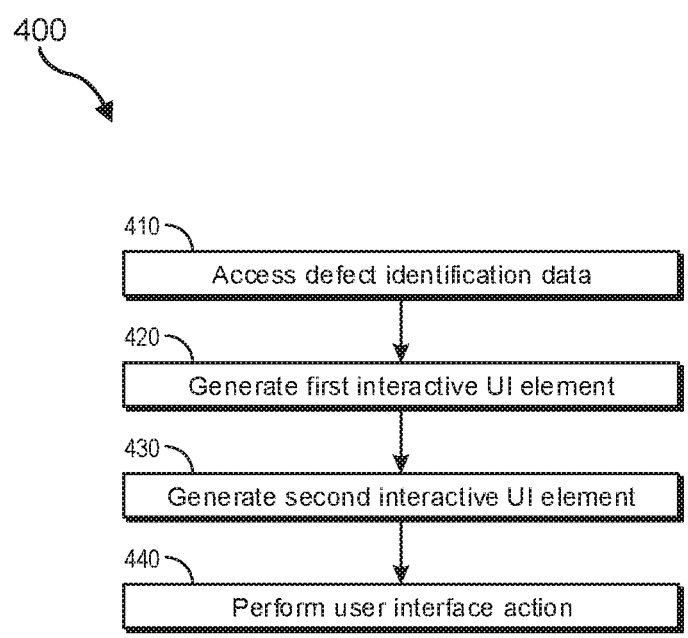
FIG. 4 is a block diagram of an exemplary method for generating an interactive user interface according to embodiments of this disclosure.

FIG. 4 is a flow diagram of an example computer-implemented method 400 for generating an interactive user interface. The steps shown in FIG. 4 may be performed by any suitable computer-executable code and/or computing system, including distribution infrastructure 110, content player 120, or a combination of the two. In one example, each of the steps shown in FIG. 4 may represent an algorithm whose structure includes and/or is represented by multiple sub-steps, examples of which will be provided in greater detail below. The steps of FIG. 4 will be described below in conjunction with computer system 501 and other components of FIG. 5. The components of FIG. 5 may also be referred to when discussing the embodiments illustrated in FIGS. 6-11.

As illustrated in FIG. 4, at step 410, one or more of the systems or modules described herein may access defect identification data that identifies defects in at least one frame of video content. For example, in system 500 of FIG. 5, an accessing module 507 of computer system 501 may access defect identification data 518 from data store 515. The data store 515 may be any type of local or remote database and may be a single data storage device or may include many data storage devices potentially distributed over a wide geographic area. The data store 515 may be configured to store many different types of video content 516. The video content 516 may be stored in different formats, in different encodings, and/or in different resolutions. This video content may be distributed (e.g., streamed) via the distribution infrastructure 110 described above. In addition to storing and/or providing video content 516, the data store 515 may store defects 517 identified in the video content.

In some embodiments, video quality control software may be implemented to detect defects in the video content 516. As indicated above, the quality control software may include algorithms that search for portions of the video content that have dead pixels, portions that are blank or distorted, or portions that include visual artifacts. Defects such as dead pixels (i.e., pixels that are either stuck high or are stuck low) may result from hardware malfunctions. For example, if a digital camera has a charge-coupled device (CCD) with one or more image sensing pixels that are not functioning correctly, the resulting video content from that camera may include a dead pixel at those locations. In cases where a movie or short video clip is shot entirely with that camera, the dead pixel might be part of every frame in the movie or video clip. If the movie was shot with multiple cameras, only scenes shot with that camera may include the dead pixel. Furthermore, in some cases, a CCD may begin capturing video content with all image sensing pixels functioning normally but after a period of time, the CCD may heat up and one or more pixels may begin to register as being stuck high or stuck low. Accordingly, in such cases, the dead pixels may not manifest until later into the video content.

Regardless of which type of defect is identified during quality control testing, the defect identification data 518 may be stored in the data store 515 and/or may be sent to computer system 501 for use by the user interface 520. The computer system 501 may be substantially any type of computer system including a local computer system (including content player 120 in FIGS. 1 and 3) or a distributed (e.g., cloud) computer system. The computer system 501 may include at least one processor 502 and at least some system memory 503. The computer system 501 may include program modules for performing a variety of different functions. The program modules may be hardware-based, software-based, or may include a combination of hardware and software. Each program module may use computing hardware and/or software to perform specified functions, including those described herein below.

For example, the communications module 504 may be configured to communicate with other computer systems. The communications module 504 may include any wired or wireless communication means that can receive and/or transmit data to or from other computer systems. These communication means may include hardware radios including, for example, a hardware-based receiver 505, a hardware-based transmitter 506, or a combined hardware-based transceiver capable of both receiving and transmitting data. The radios may be WIFI radios, cellular radios, Bluetooth radios, global positioning system (GPS) radios, or other types of radios. The communications module 504 may be configured to interact with databases, mobile computing devices (such as mobile phones or tablets), embedded or other types of computing systems.

The receiver 505 of the communications module 504 may receive the defect identification data 518. The accessing module 507 may then access the defect identification data 518 and, in some cases, may provide the defect identification data to the generating module 508. The generating module 508 may be configured to generate, as part of an interactive user interface (e.g., 520), an interactive element configured to present the frame of video content (step 420 of FIG. 4). For example, generating module 508 may generate first interactive element 521 of interactive user interface 520. The first interactive element 521 may be configured to present video content 516 and/or still video frames 523, along with other information including highlighted defects.

The generating module 508 may also generate a second interactive element 522 as part of the interactive UI 520 (step 430). The second interactive element 522 may include, among other things, selectable metadata items 524. These selectable metadata 524 items may represent defects 517 identified in the defect identification data 518. A user may, for example, select a metadata item 524 associated with a specific defect. The first interactive element 521 may then present at least one video frame 523 showing that defect.

Upon receiving an input (e.g., input 514 from user 513) selecting at least one of the selectable metadata items 524, the user interface action module 509 of computer system 501 may perform one of many different user interface action 525 (step 440).

In some cases, for example, selecting a metadata item 524 in the interactive user interface 520 may highlight a defect within a video frame. In other cases, the user interface action 525 performed when a metadata item is selected may be to draw a border around a group of defects (e.g., dead pixels). In other cases, the user interface action 525 may be to toggle between video resolutions, or to sort defects based on confidence score or to navigate between video frames, or to enable or disable object detection, or to screencast to another display device, or to perform any of a variety of different user interface actions related to identifying and resolving defects in a portion of video content.

Figure 6:
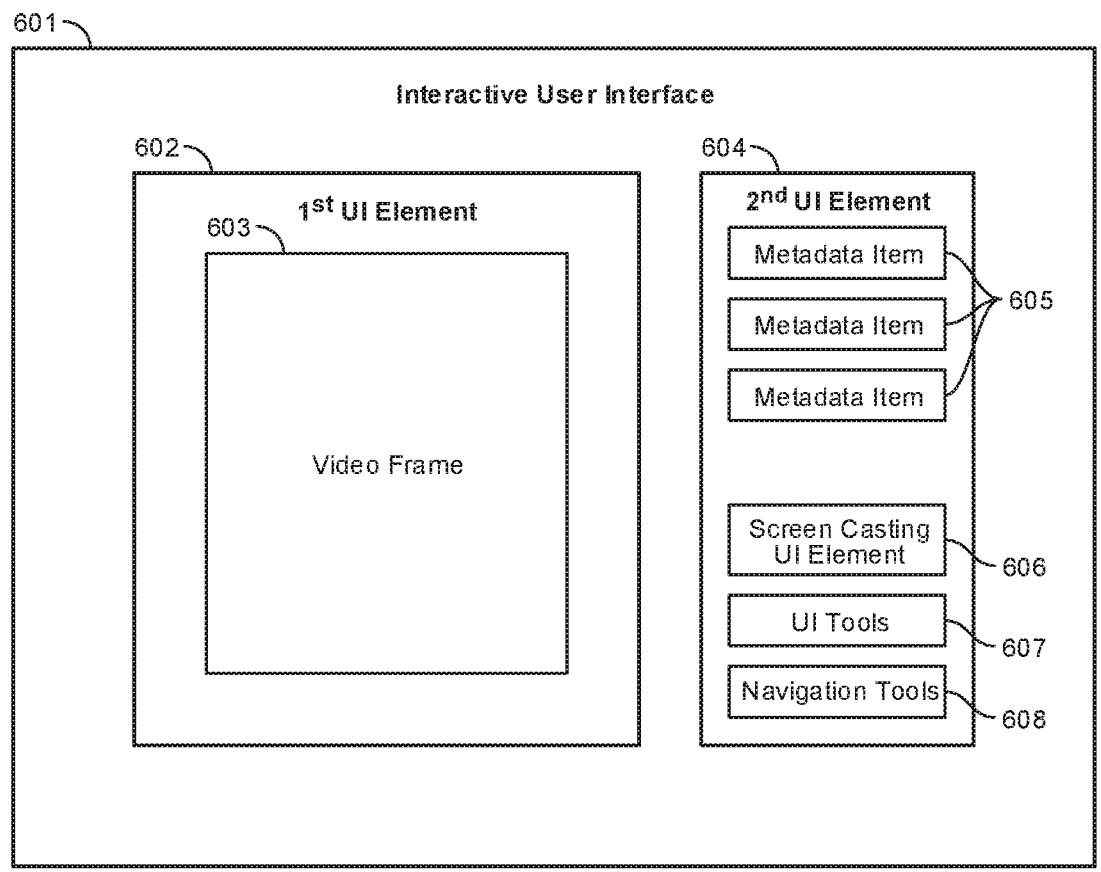
FIG. 6 illustrates an example interactive user interface including multiple UI elements.

For example, the selectable metadata items 524 of user interface 520 may, upon selection, display information associated with each video frame. Each selectable metadata item 524 may represent a defect, or a group of defects or a location of a defect, or a type of defect or a type of content having certain defects, or other defect-related information. Each of these metadata items 524 may be selectable by a user. For example, the user may click on the items using a mouse, touch the items using a touchscreen, select the items using voice commands, or otherwise perform an action that UI 520 interprets as selecting the items. Each selectable metadata item 524 may have a different user interface action 525 (or set of user interface actions) associated with it. In some embodiments, selecting a selectable metadata item 524 displays metadata associated with a displayed frame. For example, if user interface 601 of FIG. 6 is displaying video frame 603, selecting one of the metadata items 605 may display metadata associated with video frame 603. The metadata may indicate the frame resolution, frame rate, type of encoding, type of camera that shot the video (and/or the model number of the camera), the name and/or version of software application performing quality control, and other information.

The selectable metadata items 605 of user interface 601 may also allow users to perform additional user interface actions including providing feedback. For example, a user may select one of the selectable metadata items 605 to provide feedback regarding a given defect or set of defects. For instance, a quality control technician may identify a dead pixel or other defect in a certain part of a video frame. This defect may have been noticed by the user but was not caught by the quality control software application. On the other hand, the quality control software application may identify a defect and the user may decide whether to validate or invalidate the identified defect. For example, if the quality control software application indicates that a dead pixel is located at a specific position on the video frame (e.g., at an x-y coordinate position), the user can look at that position in the frame and verify whether the pixel is dead or not.

Figure 5:
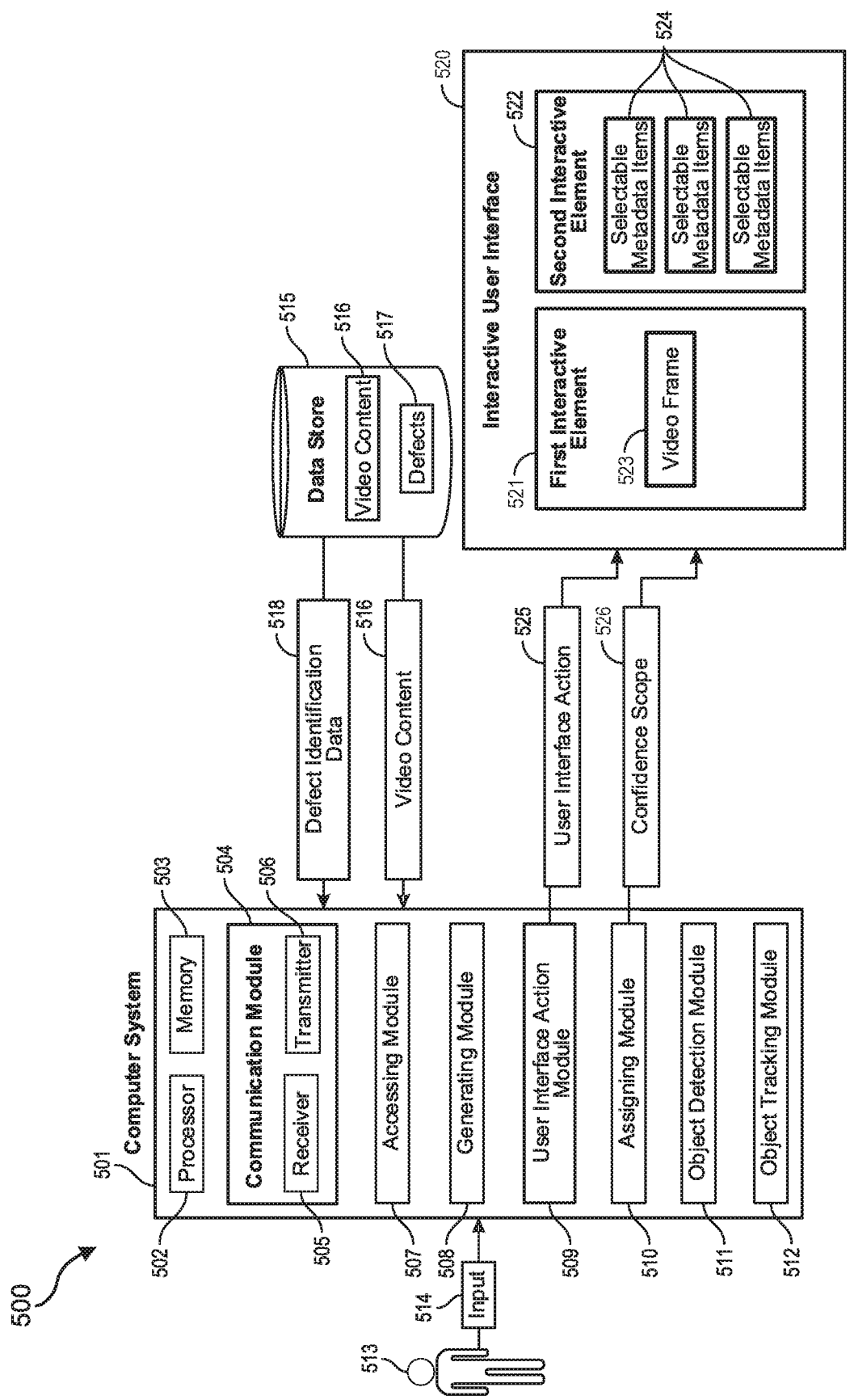
FIG. 5 is a block diagram of a computing environment in which the embodiments described herein may operate.

This feedback provided by the user either validating or invalidating a software-identified defect or identifying a defect not found by the software application may be received and stored by the computer system 501 of FIG. 5. The stored feedback may then be used in subsequent video content quality control assessments to identify defects in the video content. For instance, the stored feedback may indicate that a certain frame or series of frames had a defect in an x-y location. The master copy of the video content may be run through the quality control software a second time. During this second run, the quality control software may be aware of the defect at the x-y location. The quality control software may then concentrate its detection algorithms around the identified x-y location. In some embodiments, machine learning may be used to refine where the quality control software algorithm looks for defects or may be used to refine the thresholds for determining what is or is not a defect. Thus, by implementing feedback from quality control technicians, and potentially by implementing machine learning to improve the defect identification process, the quality control software application may be continually improved over time. Each portion of feedback from user or machine may help the quality control software application to better identify defects in future video content quality control assessments.

The user interface 601 may further include a first UI element 602 that displays a video frame 603 and a second UI element 604 that provides selectable metadata items 605 as well as other tools and UI elements. Each of these selectable metadata items 605 may include its own user interface action or sequence of actions. The interactive user interface itself 601 may appear in many different shapes and sizes, and may include only a single UI element, or many different UI elements including the illustrated $1^{st}$ and $2^{nd}$ UI elements 602 and 604. In some cases, as certain metadata items 605 are selected, the performed user interface action may be manifested in the $1^{st}$ UI element, in the $2^{nd}$ UI element, or in a $3^{rd}$ or $4^{th}$ different UI element (not shown). The interactive user interface 601 may add or remove UI elements (including buttons, menus, windows, etc.) dynamically as needed.

For example, if a user selects the screencasting UI element 606, the interactive user interface 601 may present a new menu that allows the user to cast the video content (e.g., 603) to a secondary screen. Selecting the UI tools 607 or the navigation tools 608 may similarly open in another UI element that is positioned next to, above, or below the first and second UI elements 602/604. The user 513 of FIG. 5 may, for example, select one or more of the metadata items 605 to interact with an identified defect. In some cases, this defect may be a dead pixel. Although many different defects 517 may be identified, at least some of the embodiments herein will be described herein with reference to a dead pixel. It will be understood, however, that the principles described in relation to a dead pixel may apply to identifying, verifying, and resolving substantially any type of defect.

Figure 7:
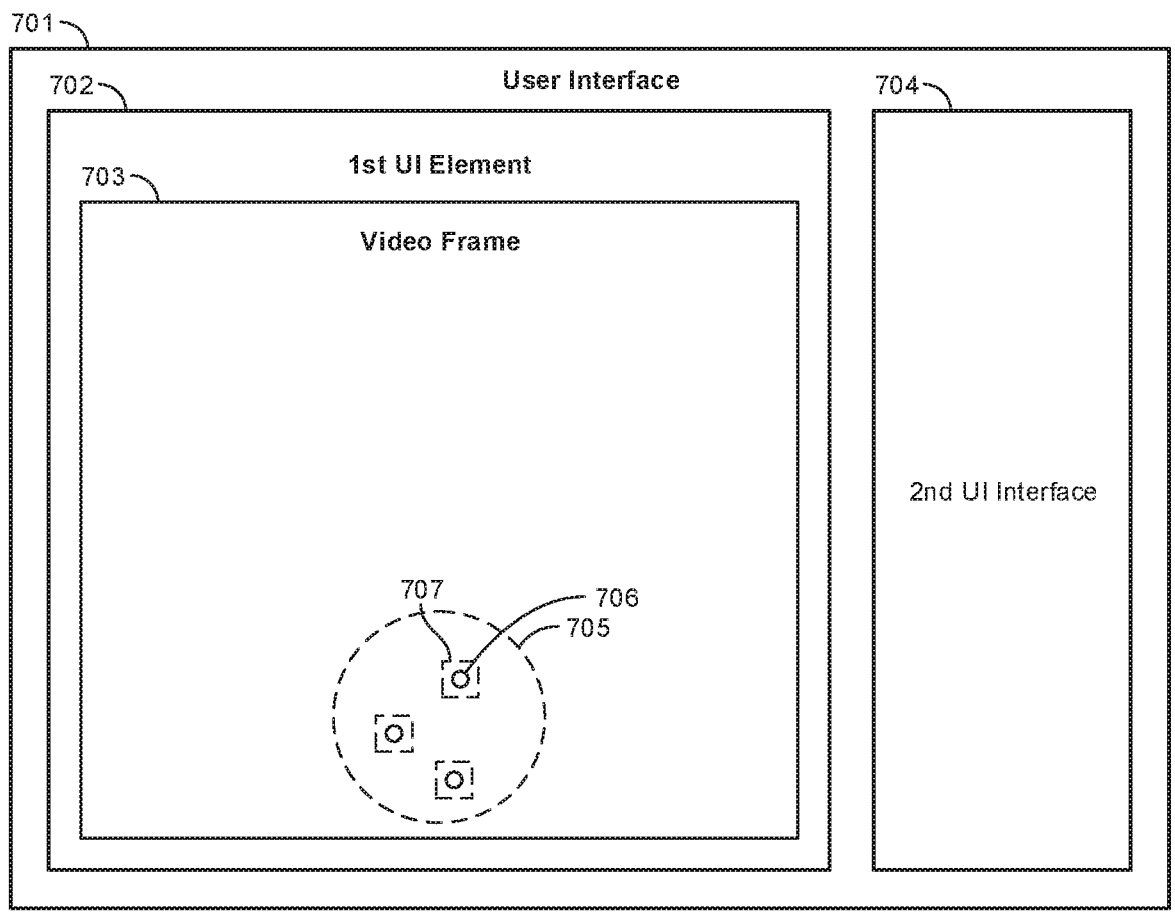
FIG. 7 illustrates an example interactive user interface that allows users to identify and group defects.

For instance, as shown in FIG. 7, a user may be able to use UI 701 to draw a border 705 around a dead pixel 706 within a presented frame of video content 703. The video frame 703 within UI element 702 may include multiple dead pixels 706, each of which may be highlighted or outlined by a dotted-line box (e.g., 707). This dotted-line box 707 may be formed around the center of the dead pixel 706. In some cases, a quality control technician or other user may notice that some of these highlighted pixels may be in the same general area on the video frame 703. As such, the user may group the dead pixels together into a group by drawing a border 705 around the dead pixels. The border may be drawn in substantially any shape or size, and may be hand-drawn, or may be selected from a set of predefined shapes. Once the dead pixels have been grouped together, the user may use the first and/or second elements of the UI 701 (i.e., elements 702 and 704) to track the defects as a group throughout the duration of the video content.

In cases where the defect is a dead pixel, the defect identification data 518 may include location information identifying the location of the dead pixel. The defect identification data 518 may also include frame-level metadata information. This frame-level metadata information may include, for example, information related to actors, objects in a scene, or type of scene. In some embodiments, the UI 701 may use location information and/or frame-level metadata information to form the dotted-line boxes 707 that highlight the dead pixels. In other cases, the user (e.g., 513) may add highlights around the dead pixel or other defect. The user may, for example place an icon or other symbol on or near the defect (e.g., an arrow pointing to the defect), or may draw a shape around the defect, or may apply a virtual sticky note or other indicator that is appended to the video frame at or near the spot of the defect. Accordingly, there are many different ways in which a user or the user interface 701 may highlight a defect on a video frame.

Figure 8:
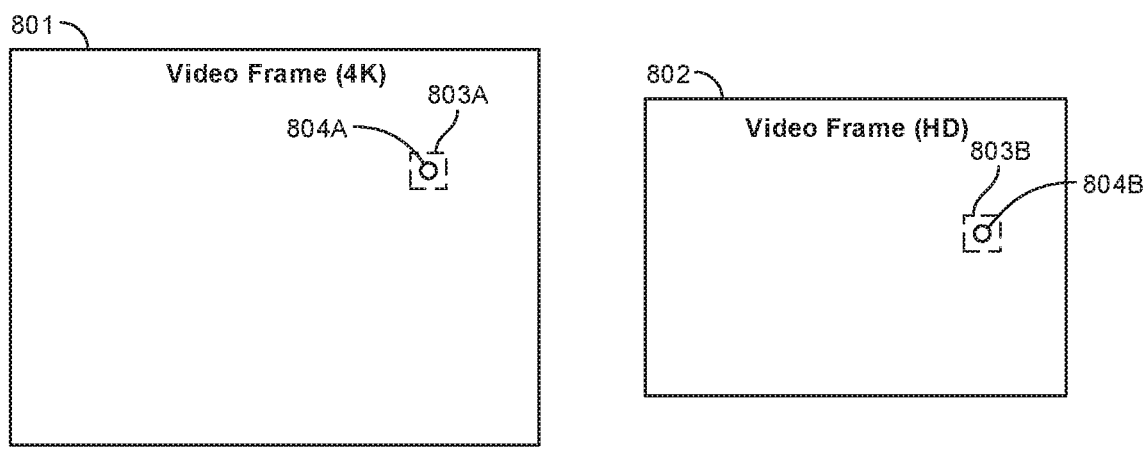
FIG. 8 illustrates an embodiment in which defect locations are identified in video frames having different resolutions.

In some embodiments, as shown in FIG. 8, the defect may be identified at a one resolution, and the frame of video content may be presented in the UI interactive element at a different specified resolution. For instance, video frame 801 may be rendered in 4K, ultra-high definition (3,840×2,160 pixels), and video frame 802 may be rendered in high definition (1,920×1,080 pixels). The user performing quality control of the video content (e.g., user 513 of FIG. 5) may initially detect the defect at a high resolution such as 4K or even 8K (7,680×4,320 pixels). However, when the data is encoded at a lower bit rate for data transfer and/or for display on a screen that has limited resolution, the location of the initially-identified defect may change. The change in location may be noted by the computer system 501.

For example, the processor 502 may be configured to extrapolate the location data for an identified defect 804A (e.g., a dead pixel) at the new (lower) resolution. As such, the outline 803A around the defect 804A may also be moved, so that the defect 804B in the lower-resolution frame 802 is outlined in the extrapolated location. Thus, even if a quality control technician identifies multiple different defects at high resolution and marks them or highlights them in some manner, this highlighting 803B may be moved along with the location of the defect 804B to the proper position in the lower-resolution frame. Embodiments where users identify defects at lower resolutions and then move to higher-resolution screens are also possible. In such cases, the extrapolation would work in reverse accounting for the change in resolution from a lower-resolution frame to a higher-resolution frame.

In addition to the method 400 described above with relation to FIG. 4, a corresponding system for generating an interactive user interface may include several modules stored in memory, including an accessing module (e.g., 507 of FIG. 5) configured to access defect identification data 518 that identifies defects 517 in at least one frame of video content 523. The system may also include a generating module 508 configured to generate, as part of an interactive user interface 520, a first interactive element 521 configured to present the frame of video content 523, as well as generate, as part of the interactive user interface, a second interactive element 522 configured to present selectable metadata items 524 associated with the identified defects in the frame of video content. The selectable metadata items 524 may include associated user interface actions 525. The system may also include a user interface action module 509 which, upon receiving an input 514 selecting at least one of the selectable metadata items 524, performs the associated user interface action. Furthermore, the system may include a processor 502 configured to execute these system modules.

Figure 9A:
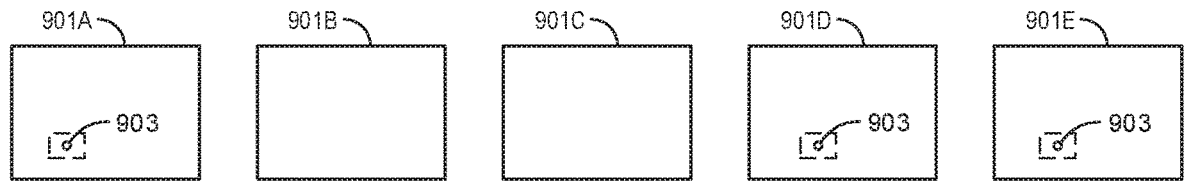
FIGS. 9A and 9B illustrate embodiments in which defects are shown in a sequence of frames.
Figure 9B:
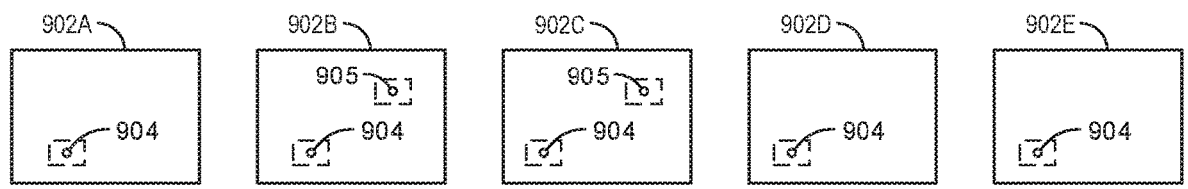

In some examples, the system 500 may also include an assigning module 510 configured to assign a confidence score 526 to at least one of the identified defects. The confidence score 526 may be generated based on a frequency of the identified defect occurring within a specified timeframe or within a specified number of frames. In cases where a confidence score is generated, the second interactive element 522 of the interactive user interface 520 may then present the identified defects based on the assigned confidence score. FIGS. 9A and 9B, for example, illustrate embodiments in which a confidence score may be generated. In FIG. 9A, for instance a defect 903 may be found in frames 901A, 901D, and 901E. In this example, the defect 903 is not found in frames 901B and 901C. The frames 901A-901E may represent five sequential video frames, or may represent a selection of frames over a given amount of time. For instance, the frames may represent five (potentially random) frames sampled from 10 seconds of video content, or from one minute of video content or from 10 minutes of video content or sampled from some other length of video content.

The assigning module 510 may determine that the defect 903 is present in three out of five frames, but that the defect was absent from two out of five sampled frames. The assigned confidence score 526 for defect 903 generated by the assigning module 510 may thus indicate an average confidence level (e.g., around 0.5 or 0.6 on a scale of 0-1). If the defect 903 had been in all sampled video frames, the confidence score may be very high (e.g., around 0.9 or 1.0). Whereas, if the defect had only shown up in one sampled frame, the confidence score may be very low (e.g., around 0.1 or 0.2). Thus, each defect may have an assigned confidence score indicating the likelihood of that defect actually being a defect.

In these examples, it will be recognized that substantially any scoring system may be used, and that any number of video frames may be sampled and used in the determination of the confidence score. To help bolster this confidence score, user feedback may be implemented. If a quality control technician looks at the defect 903, for example, and verifies that it truly is a defect, the confidence score for defect 903 may be increased. In some embodiments as noted above, the confidence score 526 assigned to a particular defect may range from 0-1. In the example of FIG. 9A, for instance, the confidence score for defect 903 may be 0.6 since the defect manifested itself in 3/5 frames. In FIG. 9B, on the other hand, because defect 904 appears in all five sampled frames 902A-902E, the confidence score for defect 904 may be around 0.95 or even 1.0 on the scale of 0-1. The confidence score for defect 905, which appears only in frames 902B and 902C, may be lower, for example, near 0.4. Accordingly, in this manner, the assigning module 510 may assign each defect a confidence score 526.

In one example a quality control software algorithm may scan a one-hour movie having, for instance, 300 shots and approximately 80,000 video frames. In this example, the quality control software algorithm may detect 500 x-y locations that have defects at different points during the timeline of the movie. Each defect may occur at different frames and for a different number of frames. As such, the assigning module 510 may assign a confidence score 526 based on how many frames the defect appeared in, and whether the defect was consistent. The user interface 520 may then sort the defects using the confidence score such that, for example, only the top five highest-rated defects are shown in the second interactive element 522 of the UI 520. The quality control software algorithm may track, for each defect, the video frame where the defect started (i.e., where the defect first occurred at a given x-y location), the video frame where the defect ended (i.e., where the defect last occurred at that x-y location), and the frequency of the defect between the two start and end frame. This may give, for each defect, a specified number of frames where the defect is present throughout the one-hour movie. As noted above, if a string of frames (e.g., frames 5,000 to 5,500) all have the same defect, the assigning module 510 may assign a relatively higher confidence to that defect. If the defect is only sparsely present in, for example, frames 6,000 to 8,000, the assigning module 510 may assign a relatively low confidence score.

In some embodiments, the second interactive element 522 of the interactive user interface 520 may present identified defects in a ranked list. In some cases, those defects with a higher confidence score 526 may be presented higher in the list of defects. Thus when a user is viewing a list of defects (e.g., metadata items 605 of FIG. 6), those defects with the highest confidence score may be presented at the top of the list. The user can thus more easily see which defects are most likely to be verifiable defects and can attend to those first. This may save the quality control user great deal of time not having to search for defects which may or may not be defects at all. The user may see those defects with a high confidence score at the top of the list and may verify and/or resolve those defects first.

Confidence scores 526 may also be assigned to groups of defects. As noted above with regard to user interface 701 of FIG. 7, a quality control user may use the user interface to group two or more defects together into a defects group. The user may draw a border 705 or bounded shape around a collection of defects (e.g., 706) and any defects within that border will be part of that group. In other cases, the user may simply select a given defect (e.g., a dead pixel) and may indicate that any defects within 10 pixels of the selected defect are to be in the group of pixels. Regardless of how the group of defects is defined, the assigning module 510 may assign a confidence score 526 to the defects group. The group confidence score may indicate a frequency of the defects occurring within the defined group over a specified amount of time or over a specified number of frames.

Thus for example, if a group of defects has three defects as shown in FIG. 7, that group of defects may be analyzed over time, such as in frame samples similar to those shown in FIGS. 9A and 9B. If the defined group shows the same three defects for all of the sampled frames, the group confidence score may be very high. Whereas, if the group shows three defects for a first sampled frame, one defect for another sampled frame, zero for another sampled frame, and two for another sampled frame, the confidence score may be much lower. Accordingly, each defect may have its own confidence score, and each group of defects may have its own group confidence score. These confidence scores may assist the quality control technician in knowing where specific problems are, and where groups of problems are within a portion of video content. The quality control technician may then draw conclusions as to which cameras or which types of cameras or which types of video production hardware are experiencing the most problems and may notify video production units of such. The video production units can then replace the faulty hardware units to avoid future video defects.

Figure 10:
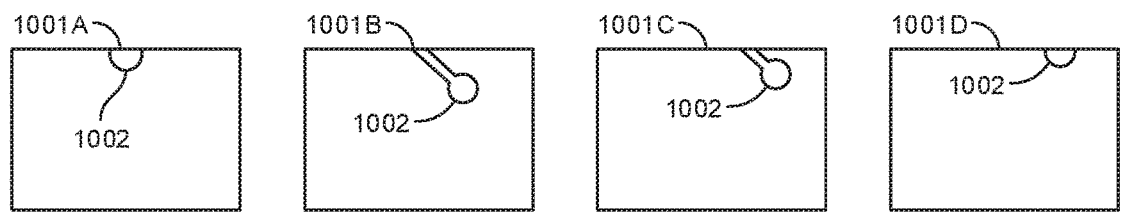
FIG. 10 illustrates an embodiment in which an object is tracked across video frames.

The system 500 may also include an object detection module 511 configured to implement an object detection algorithm to detect objects within a specified segment of the video content 516. The system 500 may also include an object tracking module 512 configured to track the detected objects to determine whether the tracked objects are defects. For example, as shown in FIG. 10, video frame 1001A may show a portion of a boom microphone 1002, which is generally undesirable. The object detection module 511 may be configured to detect objects within a video frame and may detect the undesired boom microphone 1002. As the frames progress from frame 1001A to 1001B to 10010 to 1001D, the boom microphone 1002 enters the frame more fully and then retreats. Again, these frames 1001A-1001D may not be immediately sequential frames hut may be samples taken over a given duration of the video content. The object tracking module 512 may track the boom microphone from its initial appearance to the last frame where it is visible. This information may then be presented to the user in the second UI element in a selectable metadata item (e.g., 605 of FIG. 6). The user can then use the UI to resolve the defect by directing the production unit to reshoot the affected scenes.

Figure 11:
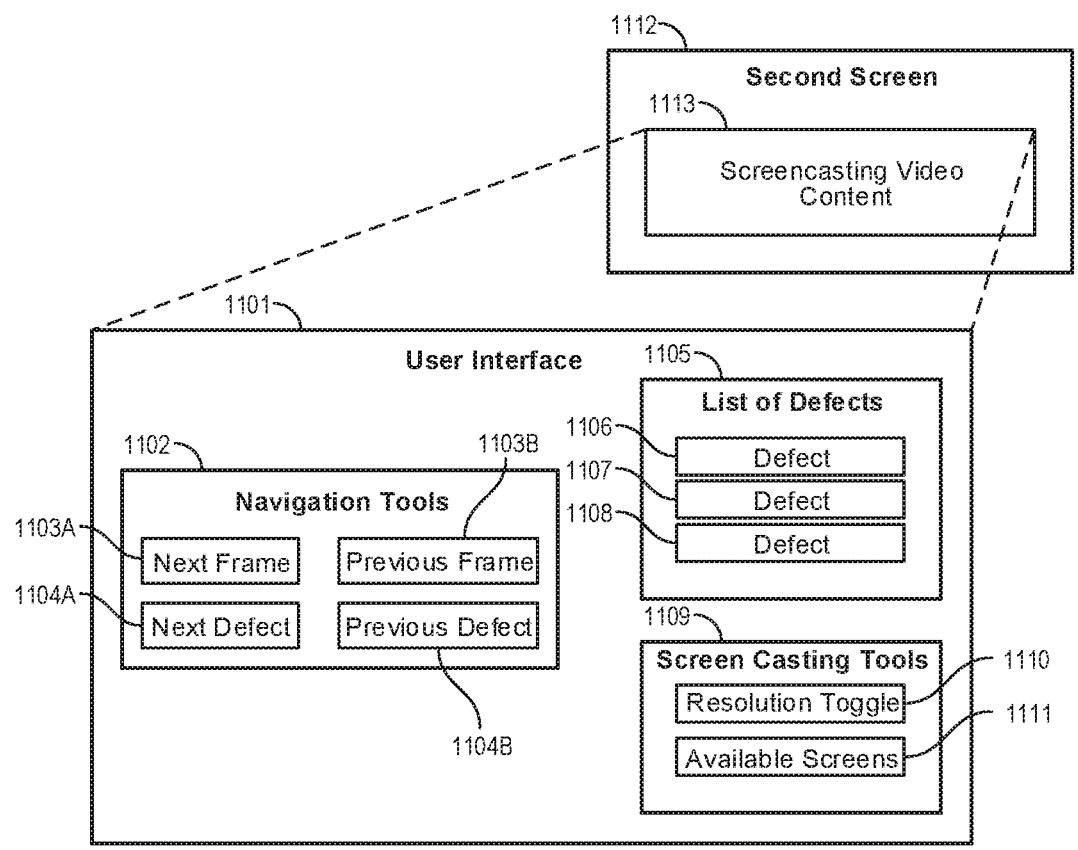
FIG. 11 illustrates an embodiment in which video content is screencast from a source to a secondary screen.

The user interface 601 may include additional tools and UI elements including a screencasting UI element 606 which, when selected casts at least a portion of the video content 516 onto a specified display. As illustrated in FIG. 11, the user interface 1101 (which may be the same as or different than user interfaces 520 and 601 of FIGS. 5 and 6, respectively) may cast video content 1113 onto second screen 1112. In the embodiment shown in FIG. 11, the user interface 1101 may be presented, for example, on a laptop, tablet or smartphone, and the video content 1113 may be cast to a television, projector, computer monitor or other (perhaps high-resolution) display device. The user interface 1101 may continue to show the video content or may replace or overlay the video content with other UI tools including navigation tools 1102, screencasting tools 1109 and/or a list of identified defects 1105.

In some cases, the video content cast to the second screen 1112 may be cast in a different resolution. For example, the video content may have a resolution of 1920×1080 in the laptop or table but may be cast to the television or computer monitor in 4K, 8K or higher resolution. The user may be able to select certain defects (e.g., 1106, 1107 or 1108) from the list of defects 1105 and see those defects presented on the second screen 1112. As with the changes in resolution described above in conjunction with FIG. 8, the computer system 501 of FIG. 5 may extrapolate where the identified defects will appear in the higher resolution content shown on the second screen. In this manner, a quality control technician may be able to perform quality control testing on any device to which they can cast the video content.

In some cases the user may be able to change resolutions via a resolution toggle 1110 in the UI 1101. The resolution toggle may, for example, change the resolution on the second screen from HD to UHD or to 8K or to some other resolution. In cases where an environment has multiple second screens that are available for screencasting, the screencasting tools UI element 1109 may also have an available screens button 1111 that allows the user to select which screen or screens to cast the video content to. Other options may allow the user to change subtitles on the secondary screen 1112, take notes regarding a given defect or video frame, log errors for a particular defect or type of screen, or to perform other defect identification or verification actions. In some cases, when a user logs an error, for example, the computer system 501 may track the video content time, frame number, type of format, type of encoding (e.g., Dolby Atmos), or other characteristics of the video. This information may be used to notify production teams which cameras or other pieces of equipment are producing errors in the video content.

Other UI tools may also be shown in the UI 1101 that allow a user to interact with the video content cast onto the specified display and/or interact with video content shown on the initial display. For example, the UI 1101 may present a navigation tools UI element 1102 that allows a user to navigate between video frames presented in the interactive user interface. For instance, the navigation tools may include next frame and previous frame UI elements 1103A and 1103B, respectively. The next frame UI element 1103A may allow the user to navigate to a frame that is subsequent to a displayed frame, and the previous UI element 1103B may allow the user to navigate to a frame that precedes the currently displayed video frame.

The navigation tools user interface 1102 may also allow users to navigate between defects identified in the video content. For example, the next defect UI element 1104A may allow the user to navigate to the next defect in the list (e.g., from defect 1106 to defect 1107), and the previous defect UI element 1104B may allow the user to navigate to the previous defect in the list (e.g., from defect 1108 to defect 1107. When navigating between frames, the defects list may be updated to show the defects present in that frame, and when navigating between defects, the video frames may be updated to show the video frame(s) having that defect. In this manner, users may be able to navigate between frames and defects in an efficient manner, whether the video frames are displayed on the main display device or are being cast to a secondary screen.

The UI tools presented in user interface 1101 may be governed by logic that attempts to present the proper UI elements at the right time. For instance, the user interface 1101 may determine that a given defect is being viewed and may recommend looking at another similar defect. This may make it easier for the quality control technician to identify other similar types of defects or other defects in the same area of a video frame. The UI tools may make other recommendations and may present different UI elements at different times depending on which aspect of testing the user is working on. The user interface 1101 may even be aware of the type of content being analyzed. For instance, the user interface 1101 (or the underlying system 500 of FIG. 5) may analyze metadata associated with the video content to determine whether the video is high quality, professional work or amateur, user-created work. Certain UI tools may be provided for professional content that would not be provided for amateur content and vice versa. Accordingly, the interactive user interface 1101 may be fully adaptable and customizable based on who is using the UI, based on the type of content being evaluated, and based on the person who created the content.

In some examples, the above-described method may be encoded as computer-readable instructions on a computer-readable medium. For example, a computer-readable medium may include one or more computer-executable instructions that, when executed by at least one processor of a computing device, may cause the computing device to generate an interactive user interface. The computing device may access defect identification data that identifies defects in at least one frame of video content and may generate, as part of an interactive user interface, a first interactive element configured to present the at least one frame of video content. The computing device may generate, as part of the interactive user interface, a second interactive element configured to present selectable metadata items associated with the identified defects in the frame of video content. At least one of the selectable metadata items may include an associated user interface action. The computing device may also perform the associated user interface action upon receiving an input selecting one of the selectable metadata items.

Thus, the embodiments herein may provide an adaptive, dynamic, and interactive user interface that allows users to identify, verify, and resolve defects. In addition to these features, however, the interactive user interface may allow users to navigate through video frames or navigate through defects, screencast to second screens and log defects using the second screen, extrapolate defect locations with changing resolutions, and generate confidence scores for recurring defects. Many other features including object detection and tracking are also provided. This dynamic user interface may be used by quality control technicians and other users to efficiently find and validate defects, as well as resolve the defects by notifying video production teams of the defects' likely causes.

1. In some embodiments, a computer-implemented method for generating an interactive user interface comprises: accessing defect identification data that identifies one or more defects in at least one frame of video content; generating, as part of the interactive user interface, a first interactive element configured to present the at least one frame of video content; generating, as part of the interactive user interface, a second interactive element configured to present one or more selectable metadata items associated with the identified defects in the at least one frame of video content, wherein at least one of the selectable metadata items includes an associated user interface action; and upon receiving an input selecting at least one of the selectable metadata items, performing the associated user interface action.

2. The computer-implemented method of clause 1, wherein the user interface action allows a user to interact with one or more of the identified defects.

3. The computer-implemented method of clauses 1 or 2, wherein the user interface action comprises automatically drawing a border around at least one of the identified defects within the presented frame of video content.

4. The computer-implemented method of any of clauses 1-3, wherein the defect comprises at least one dead pixel, wherein the defect identification data includes location information identifying the location of the at least one dead pixel, and wherein the defect identification data further includes frame-level metadata information.

5. The computer-implemented method of any of clauses 1-4, wherein the defect is identified at a first specified resolution, and wherein the at least one frame of video content is presented in the first interactive element at a second, different specified resolution.

6. The computer-implemented method of any of clauses 1-5, further comprising extrapolating location data for the identified defect at the second, different specified resolution, such that the defect is outlined in the extrapolated location according to the second, different resolution.

7. The computer-implemented method of any of clauses 1-6, wherein the user interface action allows a user upon selecting at least one of the selectable metadata items, to provide feedback regarding a defect associated with the selected metadata item.

8. The computer-implemented method of any of clauses 1-7, further comprising: receiving one or more portions of feedback regarding the defect; and implementing the received feedback in one or more subsequent video content assessments to identify defects in the video content.

9. The computer-implemented method of any of clauses 1-8, further comprising grouping two or more defects together into a defects group, the defects group including defects identified within a specified distance of each other.

10. The computer-implemented method of any of clauses 1-9, further comprising: generating a confidence score for the defects group, the confidence score indicating a frequency of one or more of the defects occurring within the defined group over a specified amount of time or over a specified number of frames.

11. The computer-implemented method of any of clauses 1-10, wherein the user interface action includes allowing a user to draw a bounded shape within the second interactive element, the bounded shape defining a defect group, such that those defects that are within the bounded shape are part of the defect group.

12. In some embodiments, a system comprises: an accessing module configured to access defect identification data that identifies one or more defects in at least one frame of video content; a generating module configured to generate, as part of an interactive user interface: a first interactive element configured to present the at least one frame of video content; and a second interactive element configured to present one or more selectable metadata items associated with the identified defects in the at least one frame of video content, wherein at least one of the selectable metadata items includes an associated user interface action; a user interface action module which, upon receiving an input selecting at least one of the selectable metadata items, performs the associated user interface action; and a processor configured to execute the recited modules.

13. The system of clause 12, further comprising: an assigning module configured to assign a confidence score to at least one of the identified defects, the confidence score being generated based on a frequency of the identified defect occurring within a specified timeframe or within a specified number of frames; and the second interactive element of the interactive user interface presenting identified defects based on the assigned confidence score.

14. The system of clauses 12 or 13, wherein defects are presented within the second interactive element of the interactive user interface in a list of defects, and wherein those defects with a higher confidence score are presented higher in the list of defects.

15. The system of any of clauses 12-44, further comprising: an object detection module configured to implement an object detection algorithm to detect one or more objects within a specified segment of the video content; and an object tracking module configured to track at least one of the detected objects to determine whether the tracked object is a defect.

16. The system of any of clauses 12-45, further comprising: a screencasting user interface element which when selected, casts at least a portion of the video content onto a specified display; and one or more user interface tools presented within the interactive user interface that allow a user to interact with the video content cast onto the specified display.

17. The system of any of clauses 12-46, wherein at least one of the user interface tools comprises a user interface element that allows a user to switch between different video resolutions when casting the video content.

18. The system of any of clauses 12-17, wherein the second interactive element of the interactive user interface includes a navigation user interface that allows a user to navigate between video frames presented in the first interactive element.

19. The system of any of clauses 12-18, wherein the navigation user interface allows the user to navigate between defects identified in the video content.

20. In some embodiments, a computer-readable medium comprises: computer-readable instructions that, when executed by at least one processor of a computing device, cause the computing device to: access defect identification data that identifies one or more defects in at least one frame of video content; generate, as part of an interactive user interface, a first interactive element configured to present the at least one frame of video content; generate, as part of the interactive user interface, a second interactive element configured to present one or more selectable metadata items associated with the identified defects in the at least one frame of video content, wherein at least one of the selectable metadata items includes an associated user interface action; and upon receiving an input selecting at least one of the selectable metadata items, perform the associated user interface action.

As detailed above the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media) and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A computer-implemented method for generating an interactive user interface comprising:
   accessing defect identification data that identifies one or more defects in at least one frame of video content, the one or more defects being detected using detection algorithms, the video content comprising a specific type of content, wherein at least one of the one or more defects is identified in at least two different resolutions of the video content, the same defect being located in a different position in each of the two resolutions, wherein the position of the same defect in the second resolution of video content is extrapolated from the position of the same defect in the first resolution, and wherein identifying the one or more defects includes implementing machine learning to refine which regions on the at least one frame of video content the detection algorithms are to concentrate on when detecting the one or more defects, the machine learning being further implemented to refine, over time, defect detection thresholds that define what qualifies as a defect in the video content;
   generating, as part of the interactive user interface, a first interactive element configured to present the at least one frame of video content;
   generating, as part of the interactive user interface, a second interactive element configured to present one or more selectable metadata items associated with the identified defects in the at least one frame of video content, wherein at least one of the selectable metadata items includes an associated user interface action, wherein the second interactive element selectively presents one or more user interface tools for interacting with the user interface according to the specified content type of the video content, at least some user interface tools only being presentable for specific content types, and wherein the second interactive element recommends, based on the type of video content being analyzed and based on the identified defects being viewed in the user interface, at least one additional similar defect in conjunction with a navigational UI element that allows the user to navigate to the similar defect; and
   upon receiving an input selecting at least one of the selectable metadata items, performing the associated user interface action;
   resolving an identified defect by removing the identified defect from the video content.

2. The computer-implemented method of claim 1, wherein the associated user interface action allows a user to interact with one or more of the identified defects.

3. The computer-implemented method of claim 1, wherein the associated user interface action comprises automatically drawing a border around at least one of the identified defects within the presented frame of video content.

4. The computer-implemented method of claim 3, wherein the at least one identified defect comprises at least one dead pixel, wherein the defect identification data includes location information identifying the location of the at least one dead pixel, and wherein the defect identification data further includes frame-level metadata information.

5. The computer-implemented method of claim 3, wherein the at least one identified defect is identified at a first specified resolution, and wherein the at least one frame of video content is presented in the first interactive element at a second, different specified resolution.

6. The computer-implemented method of claim 5, further comprising extrapolating location data for the at least one identified defect at the second, different specified resolution, such that the at least one identified defect is outlined in the extrapolated location according to the second, different resolution.

7. The computer-implemented method of claim 1, wherein the associated user interface action allows a user, upon selecting at least one of the selectable metadata items, to provide feedback regarding a defect associated with the selected metadata item.

8. The computer-implemented method of claim 7, further comprising: receiving one or more portions of feedback regarding the defect associated with the selected metadata item; and implementing the received feedback in one or more subsequent video content assessments to identify defects in the video content.

9. The computer-implemented method of claim 1, further comprising grouping two or more defects together into a defects group, the defects group including defects identified within a specified distance of each other.

10. The computer-implemented method of claim 9, further comprising: generating a confidence score for the defects group, the confidence score indicating a frequency of one or more of the defects occurring within the defined group over a specified amount of time or over a specified number of frames.

11. The computer-implemented method of claim 1, wherein the associated user interface action includes allowing a user to draw a bounded shape within the second interactive element, the bounded shape defining a defect group, such that those defects that are within the bounded shape are part of the defect group.

12. A system comprising:
an accessing module configured to access defect identification data that identifies one or more defects in at least one frame of video content, the one or more defects being detected using detection algorithms, the video content comprising a specific type of content, wherein at least one of the one or more defects is identified in at least two different resolutions of the video content, the same defect being located in a different position in each of the two resolutions, wherein the position of the same defect in the second resolution of video content is extrapolated from the position of the same defect in the first resolution, and wherein identifying the one or more defects includes implementing machine learning to refine which regions on the at least one frame of video content the detection algorithms are to concentrate on when detecting the one or more defects, the machine learning being further implemented to refine, over time, defect detection thresholds that define what qualifies as a defect in the video content;
a generating module configured to generate, as part of an interactive user interface:
a first interactive element configured to present the at least one frame of video content; and
a second interactive element configured to present one or more selectable metadata items associated with the identified defects in the at least one frame of video content, wherein at least one of the selectable metadata items includes an associated user interface action, wherein the second interactive element selectively presents one or more user interface tools for interacting with the user interface according to the specified content type of the video content, at least some user interface tools only being presentable for specific content types, and wherein the second interactive element recommends, based on the type of video content being analyzed and based on the identified defects being viewed in the user interface, at least one additional similar defect in conjunction with a navigational UI element that allows the user to navigate to the similar defect;
a user interface action module which, upon receiving an input selecting at least one of the selectable metadata items, performs the associated user interface action; and
a processor configured to execute the recited modules and to resolve an identified defect by removing the identified defect from the video content.

13. The system of claim 12, further comprising:
an assigning module configured to assign a confidence score to at least one of the identified defects, the confidence score being generated based on a frequency of the identified defect occurring within a specified timeframe or within a specified number of frames; and
the second interactive element of the interactive user interface presenting identified defects based on the assigned confidence score.

14. The system of claim 13, wherein defects are presented within the second interactive element of the interactive user interface in a list of defects, and wherein those defects with a higher confidence score are presented higher in the list of defects.

15. The system of claim 12, further comprising:
an object detection module configured to implement an object detection algorithm to detect one or more objects within a specified segment of the video content; and
an object tracking module configured to track at least one of the detected objects to determine whether the tracked object is a defect.

16. The system of claim 12, further comprising:
a screencasting user interface element which, when selected, casts at least a portion of the video content onto a specified display; and
one or more user interface tools presented within the interactive user interface that allow a user to interact with the video content cast onto the specified display.

17. The system of claim 16, wherein at least one of the user interface tools comprises a user interface element that allows a user to switch between different video resolutions when casting the video content.

18. The system of claim 12, wherein the second interactive element of the interactive user interface includes a navigation user interface that allows a user to navigate between video frames presented in the first interactive element.

19. The system of claim 18, wherein the navigation user interface allows the user to navigate between defects identified in the video content.

20. A non-transitory computer-readable medium comprising:
computer-readable instructions that, when executed by at least one processor of a computing device, cause the computing device to:
access defect identification data that identifies one or more defects in at least one frame of video content, the one or more defects being detected using detection algorithms, the video content comprising a specific type of content, wherein at least one of the one or more defects is identified in at least two different resolutions of the video content, the same defect being located in a different position in each of the two resolutions, wherein the position of the same defect in the second resolution of video content is extrapolated from the position of the same defect in the first resolution, and wherein identifying the one or more defects includes implementing machine learning to refine which regions on the at least one frame of video content the detection algorithms are to concentrate on when detecting the one or more defects, the machine learning being further implemented to refine, over time, defect detection thresholds that define what qualifies as a defect in the video content;
generate, as part of an interactive user interface, a first interactive element configured to present the at least one frame of video content;

generate, as part of the interactive user interface, a second interactive element configured to present one or more selectable metadata items associated with the identified defects in the at least one frame of video content, wherein at least one of the selectable metadata items includes an associated user interface action, wherein the second interactive element selectively presents one or more user interface tools for interacting with the user interface according to the specified content type of the video content, at least some user interface tools only being presentable for specific content types, and wherein the second interactive element recommends, based on the type of video content being analyzed and based on the identified defects being viewed in the user interface, at least one additional similar defect in conjunction with a navigational UI element that allows the user to navigate to the similar defect; and upon receiving an input selecting at least one of the selectable metadata items, perform the associated user interface action;

resolve an identified defect by removing the identified defect from the video content.

\* \* \* \* \*